United States Patent
Liese et al.

(10) Patent No.: US 12,162,973 B2
(45) Date of Patent: Dec. 10, 2024

(54) PROCESS FOR PRODUCING POLYURETHANE-POLYISOCYANURATE ELASTOMERS, SEALING MATERIALS AND ADHESIVES HAVING A LONG POT LIFE

(71) Applicant: BASF SE, Ludwigshafen am Rhein (DE)

(72) Inventors: Julia Liese, Lemfoerde (DE); Andre Kamm, Lemfoerde (DE); Hendrik Wagner, Lemfoerde (DE)

(73) Assignee: BASF SE, Ludwigshafen am Rhein (DE)

( * ) Notice: Subject to any disclaimer, the term of this patent is extended or adjusted under 35 U.S.C. 154(b) by 538 days.

(21) Appl. No.: 17/442,311

(22) PCT Filed: Mar. 25, 2020

(86) PCT No.: PCT/EP2020/058406
§ 371 (c)(1),
(2) Date: Sep. 23, 2021

(87) PCT Pub. No.: WO2020/193648
PCT Pub. Date: Oct. 1, 2020

(65) Prior Publication Data
US 2022/0153908 A1 May 19, 2022

(30) Foreign Application Priority Data
Mar. 28, 2019 (EP) ..................................... 19165696

(51) Int. Cl.
| | | |
|---|---|---|
| *C08G 18/22* | (2006.01) | |
| *C08G 18/10* | (2006.01) | |
| *C08G 18/42* | (2006.01) | |
| *C08G 18/48* | (2006.01) | |
| *C08G 18/76* | (2006.01) | |
| *C08K 3/10* | (2018.01) | |
| *C09K 3/10* | (2006.01) | |

(52) U.S. Cl.
CPC ........... *C08G 18/10* (2013.01); *C08G 18/225* (2013.01); *C08G 18/4238* (2013.01); *C08G 18/4825* (2013.01); *C08G 18/4854* (2013.01); *C08G 18/7671* (2013.01); *C09K 3/1021* (2013.01); *C09K 2200/065* (2013.01)

(58) Field of Classification Search
CPC .. C08G 18/10; C08G 18/225; C08G 18/4238; C08G 18/4825; C08G 18/4854; C08G 18/7671; C09K 3/1021
See application file for complete search history.

(56) References Cited

U.S. PATENT DOCUMENTS

| | | | | |
|---|---|---|---|---|
| 5,459,172 A | * | 10/1995 | Kaku | ................. C08G 18/4072 521/174 |
| 2004/0162385 A1 | * | 8/2004 | Krebs | .................... C08G 18/10 524/589 |
| 2010/0256311 A1 | * | 10/2010 | Doyle | ................. C08K 5/0091 252/182.13 |
| 2011/0065885 A1 | | 3/2011 | Gust et al. | |
| 2017/0267806 A1 | | 9/2017 | Goeschel et al. | |
| 2018/0148551 A1 | | 5/2018 | Goeschel et al. | |
| 2018/0179321 A1 | | 6/2018 | Verbeke et al. | |

FOREIGN PATENT DOCUMENTS

| | | |
|---|---|---|
| EP | 0643086 A1 | 3/1995 |
| JP | 2003012750 A | 1/2003 |
| WO | 2010121898 A1 | 10/2010 |
| WO | 2015078740 A1 | 6/2015 |
| WO | 2020074293 A1 | 4/2020 |

OTHER PUBLICATIONS

European Search Report for EP Patent Application No. 19165696.6, Issued on Aug. 12, 2019, 3 pages.
International Search Report and Written Opinion for corresponding PCT/EP2020/058406 mailed May 29, 2021, 13 Pages.

* cited by examiner

*Primary Examiner* — Michael L Leonard
(74) *Attorney, Agent, or Firm* — Armstrong Teasdale LLP

(57) ABSTRACT

Described herein is a process for preparing a polyurethane elastomer including the steps of (A) preparing an isocyanate prepolymer (a), where the isocyanate prepolymer has an isocyanate content in the range of $\geq 1$ wt.-% to $\leq 9$ wt.-%, and (B) preparing a reaction mixture by mixing at least one epoxy compound (b) with the isocyanate prepolymer (a) in presence of at least one catalyst (c), and where the amount of the alkali metal or alkaline earth metal salt is 0.00001 to 0.1 mol per kg of the total weight of the isocyanate prepolymer (a), the epoxy compound (b) and the catalyst (c), and heating the mixture to at least 80° C. to obtain the polyurethane elastomer. Also described herein are a polyurethane elastomer obtained by the process and a method of using the polyurethane elastomer as part of a roller or as a sealant.

14 Claims, No Drawings

PROCESS FOR PRODUCING POLYURETHANE-POLYISOCYANURATE ELASTOMERS, SEALING MATERIALS AND ADHESIVES HAVING A LONG POT LIFE

CROSS-REFERENCE TO RELATED APPLICATIONS

This application is a U.S. National Phase Application of International Patent Application No. PCT/EP2020/058406, filed Mar. 25, 2020, which claims the benefit of priority to European Patent Application No. 19165696.6, filed Mar. 28, 2019, the entire contents of which are hereby incorporated by reference herein.

The present invention relates to a process for preparing a polyurethane elastomer comprising the steps of (A) preparing an isocyanate prepolymer (a) by mixing (a1) at least one isocyanate reactive composition comprising a polyol, selected from polyester polyol polyether polyol or mixtures thereof, having an average functionality in the range of ≥1.8 to ≤2.5 and an OH value in the range of ≥20 mg KOH/g to ≤450 mg KOH/g and (a2) at least one polyisocyanate, and reacting the mixture to form the isocyanate prepolymer (a), wherein the isocyanate prepolymer has an isocyanate content in the range of ≥1 wt.-% to ≤9 wt.-%, and (B) preparing a reaction mixture by mixing at least one epoxy compound (b) with the isocyanate prepolymer (a) in presence of at least one catalyst (c), wherein the catalyst (c) is a mixture obtainable by introducing an alkali metal or alkaline earth metal salt into a compound R—NH—CO—OR', wherein R, and R' can be same or different and can be any radical known in organic chemistry, and wherein the amount of the alkali metal or alkaline earth metal salt is 0.00001 to 0.1 mol per kg of the total weight of the isocyanate prepolymer (a), the epoxy compound (b) and the catalyst (c), and heating the mixture to at least 80° C. to obtain the polyurethane elastomer. In addition, the present invention relates to a polyurethane elastomer obtained by a process according to the invention and the use of such a polyurethane elastomer as part of a roller or as a sealant.

Especially for the production of large surface area plastic parts, for example wheels and rollers for high load applications, a plastics system having a long open assembly time is required. Thus, for example the molds may be filled before the plastics system cures to afford the finished plastic. However, the plastics systems are also required to cure to afford the plastic as fast as possible so that faster demolding times become possible and profitability is thus increased. A further requirement, in particular of moldings subjected to high loads, is a high mechanical strength and in particular compression set. The required long open assembly time is generally realized by slow-reacting chain extenders, strongly reduced catalysis or by setting with atmospheric humidity. However, the result of this is that the demolding time firstly cannot be controlled and secondly entails a long curing period.

One option for producing polyisocyanurate-polyurethane elastomers is described in US 20110065885. Therein, a potassium acetate-based catalyst system is used and the open assembly time here is in the range of 10 minutes.

Patent document EP0643086 describes the reaction of polyurethane prepolymers in the presence of the 2-ethylhexanoate salt of diazabicycloundecene (DBU) as the catalyst system. The curing of the material is effected here as a one component system and may be initiated thermally from 50° C. Nevertheless, open times are still to be extended.

WO 10121898 describes a polyisocyanate component, consisting in part of a urea prepolymer (—NH—CO—NH—) bidentate towards the anion, which was mixed with lithium chloride. When this component is mixed with a diglycidyl-ether and polyol-comprising second component and this mixture is heated to 80-90° C. a rapid reaction takes place which results in a through-curing of the material. Nevertheless, elastomers with a low compression set are not mentioned in WO 10121898.

WO 2015/078740 is directed to the production of large fiber reinforced polyurethane parts. To provide the production process of these parts with a long open time and a fast curing time WO 2015/078740 suggests the application of a polyurethane catalyst mixture obtainable by introducing an alkali metal or alkaline earth metal salt into a urethane group containing compound. The production of elastomers is not suggested by WO 2015078740.

Object of the present invention is the provision of a process to produce a polyurethane elastomer wherein the reaction mixture for producing the polyurethane elastomer shows a long open time allowing also the mold filling of larger parts and a rapid curing. Further, it was object of the present invention to provide a polyurethane elastomer, obtainable by such a process, wherein the elastomer comprises a low compression set.

The object according to the present invention has been achieved by means of a process for preparing a polyurethane elastomer comprising the steps of (A) preparing an isocyanate prepolymer (a) by mixing (a1) at least one isocyanate reactive composition comprising a polyol, selected from polyester polyol, polyether polyol or mixtures thereof, having an average functionality in the range of ≥1.8 to ≤2.5 and an OH value in the range of ≥20 mg KOH/g to ≤450 mg KOH/g and (a2) at least one polyisocyanate, and reacting the mixture to form the isocyanate prepolymer (a), wherein the isocyanate prepolymer has an isocyanate content in the range of ≥1 wt.-% to ≤9 wt.-%, and (B) preparing a reaction mixture by mixing at least one epoxy compound (b) with the isocyanate prepolymer (a) in presence of at least one catalyst (c), wherein the catalyst (c) is a mixture obtainable by introducing an alkali metal or alkaline earth metal salt into a compound R—NH—CO—OR', and wherein the amount of the alkali metal or alkaline earth metal salt is 0,00001 to 0.1 mol per kg of the total weight of the isocyanate prepolymer (a), the epoxy compound (b) and the catalyst (c), and heating the mixture to at least 80° C. to obtain the polyurethane elastomer.

An elastomer according to the present invention comprises a elongation at break of at least 80%, preferably at least 150% more preferably at least 200 and especially at least 300% according to DIN 53504 and a shore hardness of at most 90 shore A, preferably at most 85 shore A, more preferably at most 75 shore A and most preferably at moat 70 shore A, while the shore A hardness is preferably more than 20, more preferably more than 30 and most preferably more than 40 shore A. In addition, an elastomer according to the invention preferably comprises a compression set of not more than 40%, more preferably not more than 25% and most preferably not more than 15%.

To produce the isocyanate prepolymer (a) in step (A), at least one isocyanate reactive composition (a1) comprising a polyol, selected from polyester polyol polyether polyol or mixtures thereof, having an average functionality in the range of ≥1.8 to ≤2.5 and an OH value in the range of ≥20 mg KOH/g to ≤450 mg KOH/g and (a2) at least one polyisocyanate are mixed. The mixture is then reacted to form the isocyanate prepolymer (a). This reaction can be performed in a well-known manner. For example, these polyisocyanate prepolymers are obtainable by reacting the isocyanates (a2) in excess, at temperatures for example of 30 to 100° C., preferably at about 80° C., with the isocyanate reactive component (a2), to give the prepolymer. The amount of the isocyanates (a2) and the isocyanate reactive component (a1) is selected to result in an isocyanate content of the finished prepolymer in the range of ≥1 wt.-% to ≤9 wt.-%, preferably more than 2 wt. % to less than 8 wt.-% and most preferably more than 4 wt. % to less than 6 wt.-%.

As isocyanate reactive composition comprising a polyol, selected from polyester polyol, polyether polyol and mixtures thereof, polyester polyols and/or polyether polyols known in the field of polyurethane chemistry having an average functionality in the range of ≥1.8 to ≤2.5, preferably 1.9 to 2.3, more preferred 1.95 to 2.1 and especially preferred 2.0 and an OH value in the range of ≥20 mg KOH/g to ≤450 mg KOH/g, preferably 25 bis 200 mg KOH/g, more preferably 30 to 120 and especially preferred 35 to 70 mg KOH/g can be applied.

As Polyetherol having an average functionality in the range of ≥1.8 to ≤2.5, preferably 1.9 to 2.3, more preferred 1.95 to 2.1 and especially preferred 2.0 and an OH value in the range of ≥20 mg KOH/g to ≤450 mg KOH/g, preferably 25 to 200 mg KOH/g, more preferably 30 to 120 and especially preferred 35 to 70 mg KOH/g, it is possible to use customary polyether polyols featuring these parameters. In this contest, according to the present invention, the OH number is determined according to DIN 53240 and the functionality of the polyols applied is to be understood as theoretical functionality. For polyether polyols this theoretical functionality for example can be obtained by calculating the functionality based on the functionality of the starting molecules. Effects of side reactions during the preparation of the polyether polyols, such as disproportionation, are not considered when determining the functionality.

As isocyanate-reactive groups there may be groups such as OH, SH and NH groups present. The polyols preferably have substantially OH groups, more preferably exclusively OH groups, as isocyanate-reactive groups. The calculation of the average OH number and the average functionality here is made on the basis of all polyols used.

The polyether polyols are obtained in the presence of catalysts by known methods, as for example by anionic polymerization of alkylene oxides with addition of at least one starter molecule, comprising 1 to 4, preferably 2 to 3 and more preferably 2 reactive hydrogen atoms in bound form. Catalysts used may be alkali metal hydroxides, such as sodium or potassium hydroxide, or alkali metal alkoxides, such as sodium methoxide, sodium or potassium ethoxide or potassium isopropoxide, or Lewis acids in the case of cationic polymerization, such as antimony pentachloride, boron trifluoride etherate or bleaching earth as catalysts. As catalysts it is additionally possible to use double metal cyanide compounds, known as DMC catalysts.

As alkylene oxides, use is made preferably of one or more compounds having 2 to 4 carbon atoms in the alkylene radical, such as tetrahydrofuran, 1,2-propylene oxide, or 1,2- and/or 2,3-butylene oxide, in each case alone or in the form of mixtures, and preferably 1,2-propylene oxide, 1,2-butylene oxide and/or 2,3-butylene oxide, especially 1,2-propylene oxide. In a preferred embodiment the polyether polyols comprise at least 70% by weight propylene oxide, more preferably at least 80% by weight and especially at least 90% by weight propylene oxide based on the total weight of the alkylene oxides.

Starter molecules contemplated include, for example, ethylene glycol, propylene glycol, diethylene glycol, dipropylene glycol, glycerol, trimethylolpropane, pentaerythritol, methylamine, ethylamine, isopropylamine, butylamine, benzylamine, aniline, toluidine, toluenediamine, naphthylamine, ethylenediamine, diethanolamine, triethanolamine, and other, especially dihydric alcohols.

In another preferred embodiment, the polyether polyols comprise polytetraethylene ether glycol (PTMEG), also known as polytetrahydrofurane (PTHF). If PTHF is present as polyether polyol, the amount of PTHF in the isocyanate reactive component (a1) is preferably at least 50%, more preferable at least 80% and most preferably at least 90%, based on the total weight of the isocyanate reactive component (a1).

As polyester polyols having an average functionality in the range of ≥1.8 to ≤2.5, preferably 1.9 to 2.3, more preferred 1.95 to 2.1 and especially preferred 2.0 and an OH value in the range of ≥20 mg KOH/g to ≤150 mg KOH/g, preferably 25 bis 200 mg KOH/g, more preferably 30 to 120 and especially preferred 35 to 70 mg KOH/g, it is possible to use customary polyether polyols featuring these parameters.

The polyester alcohols used are prepared usually by condensation of polyfunctional alcohols, preferably polyfunctional alcohols having 1 to 12 carbon atoms, such as ethylene glycol, diethylene glycol, butanediol, trimethylolpropane, glycerol or pentaerythritol, with polyfunctional carboxylic acids having 2 to 12 carbon atoms, examples being succinic acid, glutaric acid, adipic acid, suberic acid, azelaic acid, sebacic acid, decanedicarboxylic acid, maleic acid, fumaric acid, phthalic acid, isophthalic acid, terephthalic acid, and the isomers of naphthalinedicarboxylic acids, or the anhydrides thereof. Beside or in addition to the polyfunctional alcohols having 1 to 12 carbon atoms also alkoxylation products of a preferably two functional starting molecules can be used. Such alkoxylation products preferably have an OH number of less than 610 mg KOH/g. and preferably more than 100 mg KOH/g, more preferably more than 200 mg KOH/g and most preferably more than 400 mg KOH/g. In a preferred embodiment of the invention, the polyester polyols are obtained by esterification of adipic acid and butanediol. In a more preferred embodiment the polyester comprises at least 70% by weight, even more preferred at least 80% by weight and most preferred at least 90% by weight adipic acid and butanediol, based on diacid and diol used for the preparation of the polyester of the invention.

As further starting materials in the preparation of the polyesters it is possible to use hydrophobic substances. The hydrophobic substances are water-insoluble substances which comprise an non-polar organic radical and also possess at least one reactive group, selected from hydroxyl, carboxylic acid, carboxylic ester or mixtures thereof. The equivalent weight of the hydrophobic materials is preferably between 130 and 1000 g/mol. Use may be made, for example, of fatty acids, such as stearic acid, oleic acid, palmitic acid, lauric acid or linoleic acid, and also fats and oils, such as, for example, castor oil, corn oil, sunflower oil, soybean oil, coconut oil, olive oil or tall oil, for example. Where polyesters comprise hydrophobic substances, the fraction of the hydrophobic substances among the total monomer content of the polyester alcohol is preferably 1 to 30 mol %, more preferably 4 to 15 mol %.

A further group of fatty-acid derived polyols used with preference may be obtained through ring opening of epoxidized fatty acid esters with simultaneous reaction of alcohols and, optionally, further transesterification reactions subsequently. The incorporation of hydroxyl groups into oils and fats is accomplished primarily by epoxidation of the olefinic double bond present in these products, followed by the reaction of resultant epoxide groups with the mono- or polyhydric alcohol. This produces, from the epoxide ring, a hydroxyl group or, in the case of polyfunctional alcohols, a structure having a higher number of OH groups. Since oils and fats are usually glycerol esters, parallel transesterification reactions run additionally during the reactions stated above. The compounds thus obtained preferably have a molecular weight in the range from between 500 and 1500 g/mol. Products of this kind are available for example from BASF under the product designation Sovermole®.

In a preferred embodiment less than 30% by weight, more preferred less than 10 and most preferred no additional compounds having isocyanate reactive groups are used besides the isocyanate reactive components (a1) to prepare the isocyanate prepolymer (a).

As polyisocyanate (a2) all aliphatic, cycloaliphatic, and aromatic isocyanate known for the preparation of polyurethanes can be used. They preferably have an average functionality of less than 2.5. Examples are 2,2'-, 2,4'-, and 4,4'-diphenylmethane diisocyanate, the mixtures of monomeric diphenylmethane diisocyanates and higher polycyclic homologs of diphenylmethane diisocyanate (polymeric MDI), isophorone diisocyanate (IPDI) or its oligomers, 2,4- or 2,6-tolylene diisocyanate (TDI) or mixtures thereof, tetramethylene diisocyanate or its oligomers, hexamethylene diisocyanate (HDI) or its oligomers, naphthylene diisocyanate (NDI), or mixtures thereof. As polyisocyanates (a2), preference is given to monomeric, aromatic diisocyanates preferably 2,4 and 2.6-TDI, or especially preferred monomeric diphenylmethane diisocyanate, for example 2,2'-diphenylmethane diisocyanate, 2,4'-diphenylmethane diisocyanate, 4,4'-diphenylmethane diisocyanate, or mixtures thereof. Here, diphenylmethane diisocyanate may also be used as a mixture with its derivatives. In that case, diphenylmethane diisocyanate may comprise with particular preference up to 10 wt %, with further particular preference up to 5 wt %, of carbodiimide-, uretdione- or uretonimine-modified diphenylmethane diisocyanate, especially carbodiimide-modified diphenylmethane diisocyanate.

In step (B) the isocyanate (a) and at least one epoxy compound (b) are mixed in presence of at least one catalyst (c). For the mixing step, the sequence is not relevant. In one embodiment the epoxide (b) is already present during the formation of the isocyanate prepolymer (a). In a preferred embodiment, the isocyanate prepolymer is produced first and then the epoxide is added. Further, in a preferred embodiment, the catalyst (c) is not present while the isocyanate prepolymer (a) is formed.

In a preferred embodiment the isocyanate prepolymer (a) to be used in step (B) comprises less than 1 wt.-%, more preferably less than 0.5 and most preferably less than 0.1% by weight, based on the total weight of the isocyanate (a) monomeric diisocyanate. This can be ensured for example by removing an excess amount of unreacted isocyanate by distillation, for example thin film distillation.

As epoxide (b) any compound comprising one or more epoxide groups it is possible to use all epoxide-comprising compounds which are commonly used for the preparation of epoxy resins. The epoxide (b) comprising epoxide groups are preferably liquid at 25° C. Here it is also possible to use mixtures of such compounds, which are preferably likewise liquid at 25° C.

Examples of such compounds comprising epoxide groups that can be used in the context of the invention are I) Polyglycidyl and poly([beta]-methylglycidyl) esters, obtainable by reacting a compound having at least two carboxyl groups in the molecule with in each case epichlorohydrin and [beta]-methylepichlorohydrin. This reaction is advantageously catalyzed by the presence of bases.

Aliphatic polycarboxylic acids may be used, for example, as a compound having at least two carboxyl groups. Examples of such aliphatic polycarboxylic acids are oxalic acid, succinic acid, glutaric acid, adipic acid, pimelic acid, suberic acid, azelaic acid and dimerized or trimerized linoleic acid. Additionally, it is possible for cyclic, aliphatic acids to be used as well, such as tetrahydrophthalic acid, 4-methyltetrahydrophthalic acid, hexahydrophthalic acid or 4-methylhexahydrophthalic acid. Aromatic carboxylic acids too, such as phthalic acid, isophthalic acid or terephthalic acid, and also any desired mixtures of these carboxylic acids, may be used.

II) Polyglycidyl or poly([beta]-methylglycidyl) ethers, obtainable by reaction of a compound having at least two alcohol hydroxyl groups and/or phenolic hydroxyl groups with epichlorohydrin or [beta]-methylepichlorohydrin under alkaline conditions or in the presence of an acidic catalyst, and subsequent treatment with a base.

The glycidyl ethers of this type are derived for example from linear alcohols, such as ethylene glycol, diethylene glycol or higher polyoxyethylene) glycols, propane-1,2-diol or poly(oxypropylene) glycols, propane-1,3-diol, butane-1, 4-diol, poly(oxytetramethylene) glycol, pentane-1,5-diol, hexane-1,6-diol, hexane-2,4,6-triol, glycerol, 1,1,1-trimethylolpropane, pentaerythritol or sorbitol, and from poly-epichlorohydrins.

Further glycidyl ethers of this type are obtainable from cycloaliphatic alcohols, such as 1,4-cyclohexanedimethanol, bis(4-hydroxycyclohexyl)methane or 2,2-bis(4-hydroxycyclohexyl)propane, or from alcohols which carry aromatic groups and/or other functional groups, such as N,N-bis(2-hydroxyethyl)aniline or p,p'-bis(2-hydroxyethylamino)diphenylmethane.

The glycidyl ethers may also be based on monocyclic phenols, such as p-tert-butylphenol, resorcinol or hydroquinone, or on polycyclic phenols, such as bis(4-hydroxyphenyl)methane, 4,4'-dihydroxybiphenyl, bis(4-hydroxyphenyl) sulfone, 1,1,2,2-tetrakis(4-hydroxyphenyl)ethane, 2,2-bis(4-hydroxyphenyl)propane or 2,2-bis(3,5-dibromo-4-hydroxyphenyl)propane.

Further compounds comprising hydroxyl groups and suitable for the preparation of the glycidyl ethers are novolacs, obtainable by condensing aldehydes, such as formaldehyde, acetaldehyde, chloraldehyde or furfuraldehyde, with phenols or bisphenols, which may be unsubstituted or substituted, by chlorine atoms or C1 to C9 alkyl groups, for example, such as phenol, 4-chlorophenol, 2-methylphenol or 4-tert-butylphenol.

III) Poly(N-glycidyl) compounds, obtainable by dehydrochlorination of reaction products of epichlorohydrin with amines comprising at least two amine-bonded hydrogen atoms. Such amines are, for example, aniline, n-butylamine, bis(4-aminophenyl)methane, m-xylylenediamine or bis(4-methylaminophenyl)methane. The poly(N-glycidyl) compounds also include triglycidyl isocyanurates, N,N'-diglycidyl derivatives of cycloalkyleneureas, like ethyleneurea or 1,3-propyleneurea, and diglycidyl derivatives of hydantoins, like 5,5-dimethylhydantoin.

IV) Poly(S-glycidyl) compounds, such as di-S-glycidyl derivatives, which are obtainable from dithiols, for example ethane-1,2-dithiol or bis(4-mercaptomethylphenyl) ether.

V) Cycloaliphatic epoxy resins, such as bis(2,3-epoxycyclopentyl) ether, 2,3-epoxycyclopentyl glycidyl ether, 1,2-bis(2,3-epoxycyclopentyloxy)ethane or 3,4-epoxycyclohexylmethyl 3',4'-epoxycyclohexanecarboxylate.

VI) Monofunctional epoxy resins, such as 2-ethylhexyl glycidyl ether, isopropyl glycidyl ether, butyl glycidyl ether or cresyl glycidyl ether.

In the context of the invention it is likewise possible to use epoxy resins wherein the 1,2-epoxy group is bonded to different heteroatoms or functional groups. These compounds include N,N,O-triglycidyl derivatives of 4-aminophenol, the glycidyl ether glycidyl ester of salicylic acid, N-glycidyl-N'-(2-glycidyloxypropyl)-5,5-dimethylhydantoin and 2-glycidyloxy-1,3-bis(5,5-dimethyl-1-glycidylhydantoin-3-yl)propane.

Particularly preferred epoxides (b) are the compounds of classes (I) and (II), more particularly those of class (II).

The epoxide (b) is used preferably in an amount of 0.3 to 15 wt %, preferably 0.5 to 10 wt % and more particularly 0.8 to 5 wt %, based on the total weight of the isocyanate prepolymer (a) and the epoxide (b).

The catalyst (c) is a mixture obtainable by introducing an alkali metal or alkaline earth metal salt into a compound R—NH—CO—OR'.

The alkali metal salt or alkaline earth metal salt used in this context is a compound which accelerates the curing reaction of the isocyanate prepolymer (1) in presence of the epoxide. These compounds encompass, in particular, salts of sodium, lithium, magnesium, and potassium, and ammonium compounds, preferably lithium or magnesium, with any desired anions, preferably with anions of organic acids such as carboxylates and more preferably of inorganic acids, such as nitrates, halides, sulfates, sulfites, and phosphates, more preferably still with anions of monoprotic acids, such as nitrates or halides, and especially nitrates, chlorides, bromides or iodides. Particular preference is given to using lithium chloride, lithium bromide, and magnesium dichloride, and especially lithium chloride. Alkali metal or alkaline earth metal salts of the invention can be used individually or as mixtures.

Apart from the alkali metal or alkaline earth metal salt, there are preferably no further compounds used that accelerate the reaction of isocyanates with groups that are reactive toward isocyanates.

The compound R—NH—CO—OR' is a compound comprising at least one urethane group. This compound preferably is solid or preferably liquid at 20° C. In a preferred embodiment R does not stand for hydrogen and/or not for COR''. In this context, R, R' and R'' can be same or different and can be any radical known in organic chemistry.

The compound comprising urethane groups in catalyst (c) here is preferably obtainable by reaction from a second polyisocyanate and a compound having at least one OH group. Preference here is given to compounds which are liquid at 50° C., and more preferably those which are liquid at room temperature. A substance or component which is "liquid" in the context of the present invention means one which at the specified temperature has a viscosity of not more than 10 Pas. Where no temperature is specified, the datum is based on 20° C. Measurement in this context takes place according to ASTM D445-11. The compounds comprising urethane groups preferably have at least two urethane groups. The molecular weight of these compounds comprising urethane groups is preferably in the range from 200 to 15 000 g/mol, more preferably 300 to 10 000 g/mol, and more particularly 500 to 1300 g/mol. Compounds comprising urethane groups may be obtained, for example, by reaction of aforementioned isocyanates (a1) as second isocyanate with compounds which have at least one hydrogen atom that is reactive toward isocyanates, such as alcohols, examples being monoalcohols, such as methanol, ethanol, propanol, butanol, pentanol, hexanol, or longer-chain propoxylated or ethoxylated monools, such as polyethylene oxide) monomethyl ether, such as, for example, the monofunctional Pluriol® products from BASF, dialcohols, such as ethylene glycol, diethylene glycol, triethylene glycol, propylene glycol, dipropylene glycol, butanediol, hexanediol, and/or reaction products of said isocyanates with the above-described polyols (a1) and/or chain extenders—individually or in mixtures. To prepare the compound comprising urethane groups it is possible to employ not only isocyanates but also polyols in a stoichiometric excess. Where monoalcohols are used, isocyanate groups and OH groups may also be used in a stoichiometric ratio. Where the compound comprising urethane groups has two or more isocyanate groups per molecule, they may wholly or partly replace the polyisocyanates (a2). In this case prepolymer (a) is the compound comprising urethane groups in catalyst (c) and no further addition of prepolymer (a) is necessary.

Reaction takes place customarily at temperatures between 20 and 120° C., for example at 80° C. The second isocyanate, used for preparing the compound comprising urethane groups, is preferably an isomer or homolog of diphenylmethane diisocyanate. More preferably the second isocyanate is monomeric diphenylmethane diisocyanate, for example 2,2'-diphenylmethane diisocyanate, 2,4'-diphenylmethane diisocyanate, 4,4'-diphenylmethane diisocyanate, or a mixture thereof. This diphenylmethane diisocyanate may also be used as a mixture with its derivatives. In that case, diphenylmethane diisocyanate may with particular preference comprise up to 10 wt %, with further particular preference up to 5 wt %, of carbodiimide-, uretdione-, or uretonimine-modified diphenylmethane diisocyanate, especially carbodiimide-modified diphenylmethane diisocyanate. In a particularly preferred embodiment, the first isocyanate (a) and the second isocyanate for preparing the compound comprising urethane groups are identical.

The compound comprising urethane groups may also be obtained via alternative reaction pathways, as for example by reacting a carbonate with a monoamine to form a urethane group. For this purpose, for example, a propylene carbonate is reacted in a slight excess (1.1 eq) with a monoamine, e.g., a Jeffamin M 600, at 100° C. The resulting urethane may likewise be used as a compound comprising urethane group.

The mixtures comprising the alkali metal or alkaline earth metal salts and a compound comprising urethane groups may be obtained, for example, by mixing the alkali metal or alkaline earth metal salt into the compound comprising urethane groups, at room temperature or at elevated temperature, for example. This may be done using any mixer, such as a single stirrer, for example. The alkali metal or alkaline earth metal salt in this case may be used as a pure substance or in the form of a solution, in mono- or polyfunctional alcohols, for example, such as methanol, ethanol, or chain extender, or water. In one particularly preferred embodiment, commercially available prepolymer-based isocyanate is admixed directly with the dissolved salt. Suitable for this purpose for example are isocyanate prepolymers having an NCO content of 15% to 30%, in particular based on diphenylmethane diisocyanate and a polyether polyol. Isocyanates of this kind are available commercially for example from BASF under the trade name Lupranat® MP 102.

In one particularly preferred embodiment of the present invention, the alkali metal or alkaline earth metal salt is dissolved in a compound having hydrogen atoms that are reactive toward isocyanate, and this solution is subsequently mixed with the isocyanate, optionally at elevated temperature.

Particular preference is given to preparing the compound comprising urethane groups using a monool having a molecular weight of 30 to 15 000 g/mol, preferably 100 to 900 g/mol and, in a particularly preferred version, of 400 to 600 g/mol.

According to the present invention the amount of the alkali metal or alkaline earth metal salt is adjusted that the salt is present in an amount of 0,00001 to 0.1 mol per kg of the total weight of the isocyanate prepolymer (a), the epoxy compound (b) and the catalyst (c). The amount of alkali metal ions or alkaline earth metal ions per urethane group in the catalyst (c) in a preferred embodiment is 0.0001 to 3.5, based on the number of alkali metal or alkaline earth metal ions and urethane groups in catalyst (c).

Beside catalyst (c) the remaining compounds (a) and (b) and potentially additional compounds present, comprise preferably less than 0.0001 wt %, based on the total weight of components (a) and (b), of alkali metal ions or alkaline earth metal ions. With particular preference the amount of alkali metal or alkaline earth metal ions in components (a) and (b) is less than 0.00005, more preferably 0.00003, and more particularly 0.00001 wt %, based on the total weight of components (a) and (b) and, if present, further compounds.

The amount of alkali metal or alkaline earth metal ions per epoxy group is preferably greater than 0.00001 and is more preferably 0.00005 to 0.3, based in each case on the number of alkali metal or alkaline earth metal ions and epoxy groups.

The reaction mixture in step (B) may further comprise additional isocyanate reactive compounds as polyols, chain extenders or crosslinkers.

As polyols it is possible for example to use polyethers, polycarbonate polyols or polyesters that are known in polyurethane chemistry and that are same or different from compounds (a1). If additional polyols are added to the reaction mixture in step (B), they are added in a preferred embodiment after the formation of the isocyanate prepolymer (a) is completed. As additional polyols it is possible for the purposes of this invention to use compounds having at least two isocyanate-reactive groups and having a molecular weight of at least 350, preferably at least 400 g/mol, and more preferably at least 500 g/mol. Isocyanate-reactive groups present may be groups such as OH-, SH-, NH-, and CH-acid groups. The polyols preferably have essentially OH groups, more preferably exclusively OH groups, as isocyanate-reactive groups. In one preferred embodiment the polyols have at least 40%, preferably at least 60%, more preferably at least 80%, and more particularly at least 95% of secondary OH groups, based on the number of isocyanate-reactive groups.

The polyols preferably employed are polyetherols and/or polyesterols having number-average molecular weights of between 350 and 12 000, preferably 400 to 6000, more particularly 500 to less than 3000, and having preferably an average, nominal functionality of 2 to 6, preferably of 2 to 3. In a preferred embodiment, additional polyols, if used in mixing step (B), are identical to polyols (a1).

Where low molecular weight chain extenders and/or crosslinking agents are used, it is possible to use chain extenders that are known in the context of polyurethane production, while chain extenders have a functionality of 2 and crosslinkers have a functionality of 3 or more. These are preferably low molecular weight compounds having at least two isocyanate-reactive groups and used for molecular weights of less than 350 g/mol, more preferably of 60 to less than 300 g/mol. Chain extenders and/or crosslinking agents can be used to adjust mechanical properties such as hardness or elongation. This is known to a person skilled in the art. Examples of chain extenders and crosslinkers will include aliphatic, cycloaliphatic and/or araliphatic or aromatic diols having 2 to 14, preferably 2 to 10 carbon atoms, such as ethylene glycol, 1,3-propanediol, 1,4-butanediol, 1,6-hexanediol, 1,10-decanediol and bis(2-hydroxyethyl)hydroquinone, 1,2-, 1,3-, 1,4-dihydroxycyclohexane, diethylene glycol, dipropylene glycol, tripropylene glycol, triols, such as 1,2,4-, 1,3,5-trihydroxycyclohexane, glycerol and trimethylolpropane, and hydroxyl-containing polyalkylene oxides of low molecular weight that are based on ethylene oxide and/or on 1,2-propylene oxide and on the aforementioned diols and/or triols as starter molecules. Further possible low molecular weight chain extenders and/or crosslinking agents are specified for example in "Kunststoffhandbuch, volume 7, Polyurethane", Cad Hanser Verlag, 3rd edition 1993, sections 3.2 and 3.3.2. If chain extender is used preferably propane diol, 1,4 butane diol or 1,6-Hexane diol is used. With preference no chain extender is used.

The addition of additional polyol to the reaction mixture produced in the mixing step (B) is optional. Preference is given to not using additional polyol. In case that additional polyol is used the fraction of polyol (d), based on the total weight of components (a), (b) and (c), is preferably in an amount that the mixing according to step (B) is performed at an isocyanate index of more than 200, preferably more than 500 more preferably more than 1000 most preferably no further compounds having isocyanate reactive groups are added in step (B). The isocyanate index for the purposes of the present invention is the stoichiometric ratio of isocyanate groups of the isocyanate prepolymer (a) for isocyanate-reactive groups added to the mixture in step (B), multiplied by 100. Isocyanate-reactive groups are all isocyanate-reactive groups present in the reaction mixture, including those of chemical blowing agents and compounds having epoxide groups, but not the isocyanate group itself.

It is possible to add to the reaction mixture produced in step (B) additional additives. Such additives are well known in polyurethane chemistry and include filers, additives for water adsorption, flame retardants, hydrolysis inhibitors, antioxidants, and internal release agents. Such substances are stated for example in "Kunststoffhandbuch, volume 7, Polyurethane", Cad Hanser Verlag, 3rd edition 1993, sections 3.4.4 and 3.4.6 to 3.4.11.

Additives for water adsorption used are preferably aluminosilicates, selected from the group of sodium aluminasilicates, potassium aluminasilicates, calcium aluminasilicates, cesium aluminasilicates, barium aluminasilicates, magnesium aluminasilicates strontium aluminasilicates, sodium aluminophosphates, potassium aluminophosphates, calcium aluminophosphates, and mixtures thereof. Particularly preferred are mixtures of sodium, potassium, and calcium aluminasilicates, used in castor oil as carrier substance.

The additive for water absorption preferably has an average particle size of not greater than 200 μm, more preferably not greater than 150 μm, and more particularly not greater than 100 μm. The pore size of the additive of the invention for water absorption is preferably 2 to 5 Angstroms. As well as the inorganic additives for water adsorption, it is also possible to use known organic additives for water adsorption, such as orthoformates, triisopropylorthoformate for example.

If an additive for water absorption is added, it is added preferably in amounts greater than one part by weight, more preferably in the range from 1.2 to 2 parts by weight, based on the total weight of the polyisocyanurate system.

prior art. Examples of suitable flame retardants are brominated ethers (Ixol B 251), brominated alcohols, such as dibromoneopentyl alcohol, tribromoneopentyl alcohol and PHT-4-diol, and also chlorinated phosphates, such as, for example, tris(2-chloroethyl) phosphate, tris(2-chloroisopropyl) phosphate (TCPP), tris(1,3-dichloroisopropyl) phosphate, tris(2,3-dibromopropyl) phosphate and tetrakis(2-chloroethyl) ethylene diphosphate, or mixtures thereof.

Apart from the halogen-substituted phosphates already stated, use may be made of inorganic flame retardants, such as red phosphorus, preparations comprising red phosphorus, expandable graphite, aluminum oxide hydrate, antimony trioxide, arsenic oxide, ammonium polyphosphate and calcium sulfate, or cyanuric acid derivatives, such as melamine, or mixtures of at least two flame retardants, such as ammonium polyphosphates and melamine, and also, optionally, starch, or rendering the rigid polyurethane foams, produced in accordance with the invention, flame retardant.

As further liquid, halogen-free flame retardants it is possible to use diethyl ethanephosphonate (DEEP), triethyl phosphate (TEP), dimethyl propylphosphonate (DMPP), diphenyl cresyl phosphate (DPC), and others.

The flame retardants are used for the purposes of the present invention preferably in an amount of 0 to 60 wt %, more preferably of 5 to 50 wt %, more particularly of 5 to 40 wt %, based on the total weight of components (a) to (c).

As internal release agents it is possible to use all release agents customary in polyurethane production, examples being metal salts, such as zinc stearate, in diamine solution, and derivatives of polyisobutylene succinic acid.

A polyurethane system of the invention preferably has less than 0.5 wt %, more preferably less than 0.3 wt %, of water, based on the total weight of components (a) to (c).

Reaction mixtures of the invention have a long open time at 25° C., of more than 60 minutes for example, preferably of more than 90 minutes, and more preferably of more than 120 minutes. This open time is determined as described above via the increase in viscosity. On temperature increase to temperatures greater at least 80° C., preferably greater than 80 to 200° C., and more preferably to 90 to 150° C., the reaction mixture of the invention cures rapidly, in less than 50 minutes for example, preferably in less than 30 minutes, more preferably in less than 10 minutes, and more particularly in less than 5 minutes. For the purposes of the invention the curing of a reaction mixture of the invention is understood as the increase in the initial viscosity to 10 times the initial viscosity. The difference here between the open time at 25° C. and the open time at 130° C. is preferably at least 40 minutes, more preferably at least one hour, and very preferably at least 2 hours. In a preferred embodiment curing is performed in a heated mold.

With the process of the invention, preferably, a compact material is obtained, meaning that no blowing agent is added. Small amounts of blowing agent, as for example small amounts of water, which pass by condensation into the reaction mixture or the starting components during processing, by way of atmospheric moisture, are not included here. A compact polyurethane is a polyurethane which is substantially free from gas inclusions. The density of a compact polyurethane is preferably greater than 0.8 g/cm$^3$, more preferably greater than 0.9 g/cm$^3$ and, more particular greater than 1.0 g/cm$^3$.

A polyurethane elastomer obtainable by a process according to the present invention shows good mechanical properties as a low compression set, a high elasticity and a high tensile strength at relatively low hardness values of preferably less than 90 shore A and low abrasion values. Furthermore, the production pf a polyurethane according to the present invention results in low shrinkage values. Therefore, the method according to the present invention perfectly suits to the production of polyurethane sealants or polyurethane rollers, especially large rollers or large sealants which require a long open time and a fast curing.

In the text below, the present invention is illustrated using examples:

Input Materials:
Isocyanate 1 is 4,4'-diphenylmethanediisocyanate (4,4'-MDI), molar mass 250.26 g/mol
Isocyanate 2 is a mixture of 2,4-toluene diisocyanate and 2,6-toluene diisocyanate (80:20)
Isocyanate 3 is a carbodiimide-modified 4,4'-diphenylmethane diisocyanate (4,4'-MDI), NCO: 29.5% (e.g. Lupranat® MM 103 from BASF)
Polyol 1 polyether diol having OH number of about 56 constructed from tetrahydrofuran (MW: approx. 2000)
Polyol 2 polyether diol having OH number of about 56 constructed from propylene glycol and propylene oxide (PO) having functionality of about 2 (MW: approx. 2000)
Polyol 3 Polyester diol having OH number of about 56 constructed from adipic acid, 1,2-ethanediol and 1,4-butanediol having functionality of 2 (MW: approx. 2000)
Polyol 4 polyester diol having OH number of about 56 constructed from adipic acid and 1,4-butanediol having functionality of 2 (MW: approx. 2500)
Polyol 5 polyether diol having OH number of about 104 constructed from propylene glycol and propylene oxide (PO) having functionality of about 2 (MW: approx. 1000)
Polyol 6 polyether diol having OH number of about 248 constructed from propylene glycol and propylene oxide (PO) having functionality of about 2 (MW: approx. 450)
Polyol 7 polyether diol having OH number of about 28 constructed from propylene glycol and propylene oxide (PO) having functionality of about 2 (MW: approx. 4000)
Epoxy bisphenol-A-based diglycidyl ether, e.g. Araldite GY 250 from Huntsman
Additive 1 diethylene glycol bischloroformate
Additive 2 antifoam, e.g. AF9000 NE Silicone Antifoam from Momentive
Additive 3 K—Ca—Na-Zeolite A in castor oil
Catalyst 1 the reaction product of isocyanate 3 with a monofunctional polyethylene oxide having a number average molecular weight of 500 g/mol obtainable under the trade name "Pluriol® A 500 E" from BASF as a mixture with LiCl; 0.50 eq. of LiCl based on number of urethane compounds according to the invention
Catalyst 2 potassium acetate
Catalyst 3 noninventive mixture of LiCl and urea prepolymer obtainable by reaction of Jeffamin M600 and isocyanate 3 and also 0.70 equivalents of LiCl based on the number of urea compounds in the prepolymer amount such as described accordingly in WO10121898.
Chain extender 1 1,4-butanediol Comparative Examples and Inventive Examples 1. Prepolymers
Production of the Prepolymer Isocyanate is initially charged at about 50° C. into a 4000 ml round-necked flask fitted with a PT100 thermocouple, nitrogen feed, stirrer and heating mantle and a polyol is added at this temperature. The reaction mixture is heated to 80° C. and stirred for 2 hours at 80° C. The resulting prepolymer is then allowed to reach room temperature and without further treatment is used for the following application.

|  | Prepolymer 1 | Prepolymer 2 | Prepolymer 3 |
|---|---|---|---|
| Isocyanate 1 [g] | 26.50 | 24.70 | 25.0 |
| Polyol 1 [g] | 73.48 | | |
| Polyol 2 [g] | | 75.29 | |
| Polyol 3 [g] | | | 75.0 |
| Additive 1 [g] | 0.02 | 0.01 | |
| NCO [%] | 5.6 | 5.2 | 5.2 |

|  | Prepolymer 4 | Prepolymer 5 | Prepolymer 6 |
|---|---|---|---|
| Isocyanate 1 [g] | 20 | 35 | 50 |
| Polyol 3 [g] | 80 | 65 | 50 |
| NCO [%] | 3.3 | 8.9 | 14.7 |

|  | Pre-polymer 7 | Pre-polymer 8 | Pre-polymer 9 | Pre-polymer 10 |
|---|---|---|---|---|
| Isocyanate 1 [g] | 35 | 43 | 55 | 23 |
| Polyol 4 [g] | 65 | | | |
| Polyol 5 [g] | | 57 | | |
| Polyol 6 [g] | | | 45 | |
| Polyol 7 [g] | | | | 77 |
| NCO [%] | 5.2 | 9.9 | 10.0 | 5.2 |

|  | Prepolymer 11 |
|---|---|
| Isocyanate 2 [g] | 18 |
| Polyol 2 [g] | 82 |
| NCO [%] | 9.4 |

2. Elastomers, Sealants and Adhesives
Production of the Polyurethane Based on Prepolymers The components (see formulation) were mixed for 20 seconds in a vacuum speed mixer at 1800 rpm and subsequently poured into the stepped mold (110° C.). The cured test sheets were subsequently conditioned at 90° C. for 24 h.

Properties of the solid polyurethane and resulting test specimens:

The following properties of the obtained polyurethanes were determined by the recited methods:
Density: DIN EN ISO 1183-1, A.
Hardness (Shore A/D): DIN ISO 7619-1
Tensile strength/elongation at break: DIN 53504
Tear resistance: DIN ISO 34-1, B (b)
Measurement of abrasion: DIN ISO 4649
Glass transition temperature: The $T_g$ was determined by differential scanning calorimetry.
Curing and mechanical properties: Formulation of reactive mixture:

|  | Comparative examples 1, 3 to 6 | Comparative example 2 | Examples 1 to 7 |
|---|---|---|---|
| Prepolymer | 91.5 | 94.5 | 91.5 |
| Catalyst [g] | 1 | 3 | 1 |
| Epoxy [g] | 5 | — | 5 |
| Additive 2 [g] | 0.5 | 0.5 | 0.5 |
| Additive 3 [g] | 2 | 2 | 2 |

|  | Comparative 1 | Comparative 2 |
|---|---|---|
| Prepolymer | Prepolymer 1 | Prepolymer 1 |
| Catalyst | 2 | 3 |
| Open assembly time at melting temp of prepolymer (max 55° C.) | <1 minute | No complete curing |
| Hardness [Shore A] | — | — |
| Tensile Strength [Mpa] | — | — |
| Elongation at break [%] | — | — |
| Tear resistance [kN/m] | — | — |
| Compression set (23/70° C.) [%] | — | — |

|  | Example 1 | Example 2 | Example 3 |
|---|---|---|---|
| Prepolymer | Pre-polymer 1 | Pre-polymer 2 | Pre-polymer 3 |
| Catalyst | 1 | 1 | 1 |
| Open assembly time at melting temp of prepolymer (max 55° C.) | >48 h | >48 h | >48 h |
| Hardness [Shore A] | 57 | 64 | 59 |
| Tensile Strength [Mpa] | 6 | 5 | 10 |
| Elongation at break [%] | 240 | 180 | 310 |
| Tear resistance [kN/m] | 8 | 7 | 10 |
| Rebound resilience [%] | 42 | 54 | 18 |
| Abrasion (mm³) | 94 | 46 | 56 |
| Shrinkage (%) | 0.8 | 0.8 | 0.8 |
| Compression set (23/70° C.) [%] | 17/15 | 20/21 | 3/3 |

|  | Example 4 | Example 5 | Comparative 3 |
|---|---|---|---|
| Prepolymer | Pre-polymer 4 | Pre-polymer 5 | Pre-polymer 6 |
| Open assembly time at melting temp of pre-polymer (max 55° C.) | >48 h | >48 h | >48 h |
| Hardness [Shore A] | 51 | 88 | 74 ShD |
| Tensile Strength [Mpa] | 4 | 18 | 53 |
| Elongation at break [%] | 400 | 80 | 10 |
| Tear resistance [kN/m] | 7 | 20 | 40 |
| Compression set (23/70° C.) [%] | 3/5 | 26/4 | —/— |

|  | Example 6 | Comparative 4 | Comparative 5 |
|---|---|---|---|
| Prepolymer | 7 | 8 | 9 |
| Open assembly time at melting temp of pre-polymer (max 55° C.) | >48 h | >48 h | >48 h |
| Hardness [Shore A] | 92 | 93 | 74 ShD |
| Tensile Strength [Mpa] | 19 | 23 | 65 |
| Elongation at break [%] | 90 | 100 | 10 |
| Tear resistance [kN/m] | 21 | 43 | 102 |
| Compression set (23/70° C.) [%] | 32/8 | 66/38 | 97/107 |

|  | Example 7 | Comparative 6 |
|---|---|---|
| Prepolymer | 10 | 9 |
| Open assembly time at melting temp of prepolymer (max 55° C.) | > 48 h | > 48 h |
| Hardness [Shore A] | 83 | 38 |
| Tensile Strength [Mpa] | 8 | 2 |
| Elongation at break [%] | 40 | 240 |
| Tear resistance [kN/m] | 7 | 7 |
| Compression set (23/70° C.) [%] | —/— | 12/14 |

The examples show that in the selected NCO range the prepolymer and, if polyols according to the invention are used to produce the prepolymers, very good mechanical properties are obtained, especially for elongation and compression set with a hardness of less than 90 shore A. If non-inventive catalysts which are bidentate towards the anion, for example such catalysts as disclosed in WO10121898, are used, curing at elevated temperatures is not sufficient for a reasonable catalyst amount. When used in larger quantities, e.g. in 10 parts by weight instead of 1 part by weight, curing may take place at elevated temperature, but such a high amount of catalyst is undesirable and leads to undesirable deterioration of the mechanical properties of the elastomer obtained.

The following table shows formulations which are cured in presence of additional isocyanate reactive components.

Formulation of the reactant mixture with copolyol or chain extender:

|  | Example 12 | Example 13 |
|---|---|---|
| Prepolymer 1 [g] | 100 | 100 |
| Chain extender 1 [g] | 92 |  |
| Polyol 2 [g] |  | 92 |
| Catalyst 1 [g] | 1 [g] | 1 [g] |
| Epoxy [g] | 4.5 [g] | 4.5 [g] |
| Additive 2 [g] | 0.5 [g] | 0.5 [g] |
| Additive 3 [g] | 2 [g] | 2 [g] |
| Index | 300 | 300 |

| Mechanics/Prepolymer | Example 12 | Example 13 |
|---|---|---|
| Open assembly time at melting temp of prepolymer (max 55° C.) | > 5 h | > 5 h |
| Hardness [Shore A] | 92 | 38 |
| Tensile Strength [Mpa] | 19 | 2 |
| Elongation at break [%] | 90 | 240 |
| Tear resistance [kN/m] | 21 | 7 |
| Compression set (23/70° C.) [%] | 32/8 | 12/14 |

Also formulations according to the invention which are cured in presence of additional isocyanate reactive components show long open time at room temperature and a fast curing at temperatures above 80° C.

The invention claimed is:

1. A process for preparing a polyurethane elastomer comprising the steps of:
   A) preparing an isocyanate prepolymer (a) by mixing
      (a1) at least one isocyanate reactive composition comprising a polyol, selected from the group consisting of polyester polyol, polyether polyol, and mixtures thereof, having an average functionality in the range of ≥1.8 to ≤2.5 and an OH value in the range of ≥20 mg KOH/g to ≤450 mg KOH/g, and
      (a2) at least one polyisocyanate,
   and reacting the mixture to form the isocyanate prepolymer (a), wherein the isocyanate prepolymer has an isocyanate content in the range of ≥1 wt.-% to ≤9 wt.-%, and
   B) preparing a reaction mixture by mixing at least one epoxy compound (b) with the isocyanate prepolymer (a) in the presence of at least one catalyst (c), wherein the catalyst (c) is a mixture obtained by introducing an alkali metal or alkaline earth metal salt into a compound containing urethane groups R—NH—CO—OR', wherein R, and R' are the same or different and are any radical known in organic chemistry, and wherein the amount of the alkali metal or alkaline earth metal salt is 0.00001 to 0.1 mol per kg of the total weight of the isocyanate prepolymer (a), the epoxy compound (b) and the catalyst (c), and the catalyst (c) is not present while the isocyanate prepolymer (a) is formed, and
   C) heating the mixture to at least 80° C. to obtain the polyurethane elastomer;
   wherein the polyurethane elastomer comprises a compression set of not more than 40%.

2. A process according to claim 1, characterized in that the catalyst (c) is obtained by introducing an alkali metal or alkaline earth metal salt into at least a part of the isocyanate prepolymer (a).

3. A process according to claim 1, characterized in that a first polyisocyanate is used as polyisocyanate (a2), and the compound containing urethane groups in catalyst (c) is a reaction product of a second polyisocyanate and a compound having an OH group.

4. A process according to claim 1, characterized in that the amount of alkali metal ions or alkaline earth metal ions per urethane group in the catalyst (c) is 0.0001 to 3.5, based on the number of alkali metal or alkaline earth metal ions and urethane groups in catalyst (c).

5. A process according to claim 1, characterized in that the alkali metal salt or alkaline earth metal salt is lithium chloride.

6. A process according to claim 1, characterized in that the isocyanate reactive component (a1) comprises polytetrahydrofurane.

7. A process according to claim 1, characterized in that the isocyanate reactive component (a1) comprises polyetherpolyol, obtained by alkoxylation of a starter molecule wherein the alkyleneoxide comprises at least 70% by weight propylenoxide.

8. A process according to claim 1, characterized in that the isocyanate reactive component (a1) comprises polyesterol, obtained by esterification of adipic acid and butanediol.

9. A process according to claim 1, characterized in that the isocyanate (a2) comprises monomeric, aromatic diisocyanates.

10. A process according to claim 1, characterized in that the isocyanate prepolymer to be used in step (B) comprises less than 1 wt.-% monomeric diisocyanate.

11. A polyurethane elastomer obtained by a process according to claim 1.

12. A method of using the polyurethane elastomer according to claim 11, the method comprising using the polyurethane elastomer as part of a roller or a sealant.

13. A process according to claim 1, characterized in that the polyurethane elastomer comprises a compression set of not more than 25%.

14. A process according to claim 1, characterized in that the polyurethane elastomer comprises a compression set of not more than 15%.

* * * * *